United States Patent
Hsieh et al.

(10) Patent No.: US 9,325,489 B2
(45) Date of Patent: Apr. 26, 2016

(54) DATA RECEIVERS AND METHODS OF IMPLEMENTING DATA RECEIVERS IN AN INTEGRATED CIRCUIT

(71) Applicant: Xilinx, Inc., San Jose, CA (US)

(72) Inventors: Cheng-Hsiang Hsieh, Taipei (TW); Kun-Yung Chang, Los Altos, CA (US); Jafar Savoj, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/135,071

(22) Filed: Dec. 19, 2013

(65) Prior Publication Data

US 2015/0180642 A1 Jun. 25, 2015

(51) Int. Cl.
*H04L 7/00* (2006.01)
*H04L 7/033* (2006.01)
*H04L 25/03* (2006.01)

(52) U.S. Cl.
CPC ............ *H04L 7/0025* (2013.01); *H04L 7/0062* (2013.01); *H04L 7/0331* (2013.01); *H04L 7/0334* (2013.01); *H04L 25/03057* (2013.01); *H04L 25/03885* (2013.01)

(58) Field of Classification Search
CPC ..... H04L 7/033; H04L 7/0062; H04L 7/0054; H04L 2027/0038; H04L 7/0025
See application file for complete search history.

(56) References Cited

U.S. PATENT DOCUMENTS

| | | | |
|---|---|---|---|
| 7,376,767 B1 | 5/2008 | Black et al. | |
| 8,294,490 B1 | 10/2012 | Kaviani | |
| 8,396,110 B1* | 3/2013 | Hsieh | 375/233 |
| 8,537,886 B1* | 9/2013 | Su et al. | 375/233 |
| 8,548,071 B2 | 10/2013 | Collins | |
| 2006/0188043 A1* | 8/2006 | Zerbe et al. | 375/346 |
| 2008/0219390 A1 | 9/2008 | Simpson et al. | |
| 2010/0046683 A1 | 2/2010 | Beukema et al. | |
| 2010/0289544 A1* | 11/2010 | Lee et al. | 327/159 |
| 2012/0236925 A1* | 9/2012 | Zhong | 375/233 |
| 2012/0257652 A1* | 10/2012 | Malipatil et al. | 375/219 |
| 2013/0114663 A1* | 5/2013 | Ding et al. | 375/230 |
| 2013/0322506 A1* | 12/2013 | Zerbe et al. | 375/224 |
| 2014/0029143 A1* | 1/2014 | Lim et al. | 361/56 |
| 2014/0092951 A1* | 4/2014 | Bhagavathula et al. | 375/229 |
| 2014/0307769 A1* | 10/2014 | He et al. | 375/233 |

FOREIGN PATENT DOCUMENTS

WO 2013158106 10/2013

OTHER PUBLICATIONS

Jafar Savoj, Kenny Hsieh, Parag Upadhyaya, Fu-Tai An, Ade Bekele, Stanley Chen, Xuewen Jiang, Kang Wei Lai, Chi Fung Poon, Aman Sewani, Didem Turker, Karthik Venna, Daniel Wu, Bruce Xu, Elad Alon and Ken Chang, "A Wide Common-Mode Fully-Adaptive Multi-Standard 12.5Gb/s Backplane Transceiver in 28nm CMOS", Xilinx, U.C. Berkeley, IEEE, Jun. 2012.*
Kalantari, Nardar et al., "A Multichannel Serial Link Receiver with Dual-Loop Clock-and-Data Recovery and channel Equalization", IEEE Transactions on Circuits and Systems I: Regular Papers, IEEE, US, vol. 60, No. 11, Nov. 1, 2013, pp. 2920-2931.

* cited by examiner

*Primary Examiner* — Aristocratis Fotakis
(74) *Attorney, Agent, or Firm* — John J. King

(57) ABSTRACT

A data receiver implemented in an integrated circuit is described. The data receiver comprises an input receiving a data signal; a first equalization circuit coupled to receive the data signal, wherein the first equalization circuit is used to receive the data of the data signal; and a second equalization circuit coupled to receive the data signal, wherein the second equalization circuit is used to adjust a clock phase offset.

20 Claims, 7 Drawing Sheets

DATA RECEIVERS AND METHODS OF IMPLEMENTING DATA RECEIVERS IN AN INTEGRATED CIRCUIT

FIELD OF THE INVENTION

The present invention relates generally to integrated circuit devices, and in particular, to data receivers and methods of implementing a data receiver in an integrated circuit device.

BACKGROUND OF THE INVENTION

Integrated circuit devices are an important part of many electronic devices, where the operation of an electronic device as a whole depends upon the operation of the integrated circuit devices. Data transmission is an important element of many integrated circuit devices. The speed and reliability of data transmission impacts the operation of an electronic device. Data can be transmitted as serial data or parallel data. Serializer-Deserializers (Serdes) transceivers, also known as Multi-Giga-bit Transceivers, are widely used to communicate digital data over backplanes at extremely high speeds. Receivers of Serdes transceivers have two key functional blocks, including an Equalization block which is responsible for opening up the eyes of a data signal, and a Clock and Data Recovery (CDR) block which is responsible for recovering the clock from the data so the eyes can be optimally strobed.

Equalization is necessary because backplane channels have frequency-dependent losses that give inter-symbol interference (ISI), causing the eyes to close down. CDR is necessary because, in a Serdes transceiver, the clock timing information is embedded in the data itself. This approach removes the delay-matching requirement (between data and clock) of a traditional parallel bus. However, conventional techniques of enabling a Serdes transceiver can be costly to implement and have a number of drawbacks.

SUMMARY OF THE INVENTION

A data receiver implemented in an integrated circuit is described. The data receiver comprises an input receiving a data signal; a first equalization circuit coupled to receive the data signal, wherein the first equalization circuit is used to receive the data of the data signal; and a second equalization circuit coupled to receive the data signal, wherein the second equalization circuit is used to adjust a clock phase offset.

Another data receiver implemented in an integrated circuit comprises an input receiving a data signal; a first clock and data recovery circuit used to receive data of the data signal; and a second clock and data recover circuit used to adjust a clock phase offset.

A method of implementing a data receiver in an integrated circuit is also disclosed. The method comprises receiving a data signal; implementing a first clock and data recovery circuit in the data receiver to recover the data of the data signal; and implementing a second clock and data recovery circuit in the data receiver to adjust a clock phase offset.

DETAILED DESCRIPTION OF THE DRAWINGS

Figure 1:
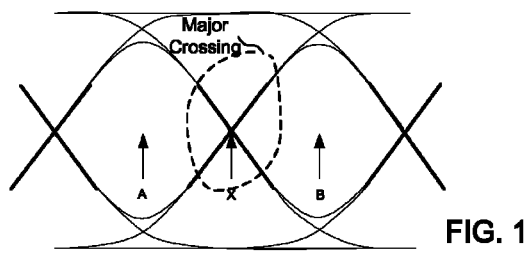
FIG. 1 is timing diagram showing the detection of data of a data signal.

The various circuits and methods set forth below relate to a data receiver implemented in an integrated circuit. The circuits and methods reduce circuit requirements and improve performance by selectively implementing different equalizers and CDR circuits in a data receiver, such as by a data receiver implemented in an integrated circuit. More particularly, separate CDR circuits are implemented to perform the separate functions of receiving data and adjusting a clock phase offset. For example, an Alexander CDR circuit may be implemented to receive data, while a Mueller-Muller CDR circuit may be implemented in the same circuit to adjust a clock phase offset. Separate equalization circuits are implemented with the different CDR circuits, where the equalization circuits are selected for a particular CDR circuit.

As will be described in more detail below, the circuit arrangements provide significant benefits and overcome various problems while implementing a data receiver. For example, there is no need to perform unrolling in the crossings when the separate CDR circuits are implemented. For conventional, very high-speed designs that need to implement unrolling for more than 1 bit, this benefit is even more significant. The total slicer number is also reduced, saving frontend and clocking power. The circuits and methods also allow the use of a strong continuous time linear equalizer (CTLE) to open up the eyes crossings without affecting payload data signal-to-noise ratio (SNR). The circuits and methods also solve any CDR speed issue associated with the implementation of a circuit based upon minor crossings, such as a Mueller-Muller CDR circuit in a data receiver which does not use all of the data transitions. The circuits and methods also solve any issue of meeting a clock pattern requirement, such as a compliant jitter tolerance pattern (CJTPAT) sent in many data transmission protocols, which may not be possible when implementing a Mueller-Muller CDR circuit alone. While non-unrolled crossings in a design may see poor eye openings and thus fuzzy crossings for cases with high backplane losses, the various circuits and methods set forth below overcome the poor eye openings by separately using a channel-inversion CTLE.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms.

Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Turning first to FIG. 1, a timing diagram shows the detection of data of a data signal, and more particularly the detection of data using an Alexander CDR circuit. The Alexander CDR phase-detection algorithm (also known as 2X-oversampling) use "major" crossings between data bits to extract the embedded clock timing information. An Alexander CDR circuit searches for a timing point that has the same probability (i.e. a 50% probability) of the captured crossing being equal to the before-transition-bit or equal to the after-transition-bit. Because all data transitions are used, Alexander CDR is data-pattern agnostic. As shown in FIG. 1, if the captured crossing X is the same as A (which is opposite of B), the clock is early. If the captured crossing X is the same as B, then the clock is late. However, as will be described in more detail below, it may be costly to implement an Alexander CDR circuit when implementing circuit functions of a receiver, such as clock phase control.

Figure 2:
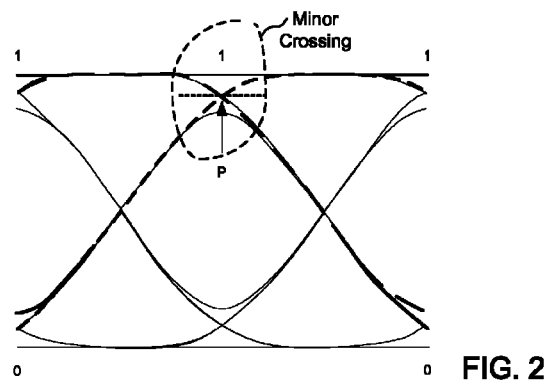
FIG. 2 is another timing diagram showing the detection of data of a data signal.

Turning now to FIG. 2, another timing diagram shows the detection of data of a data signal using a Mueller-Muller CDR algorithm (also known as Baud-rate or Timing-gradient CDR). The Mueller-Muller CDR uses "minor" crossings as shown in FIG. 2 to extract the clock. Minor crossings, formed at peaks of eyes, are due to the waveform-bending by the pre-cursor and post-cursor inter-symbol interferences (ISIs). In FIG. 2, the curve shown by the short dashed line is bent by the post-cursor ISI (i.e. data transition happened before the peak). The curve shown by the long dashed line is bent by the pre-cursor ISI (i.e. a data transition happens after the peak). That is, a Mueller-Muller CDR implementation seeks a sampling point in the after-equalization eyes that has the same amount of pre-cursor and post-cursor ISIs. It should be noted that the other half (i.e. the bottom transitions) of the pattern of FIG. 2 has been skipped. Since the short-dashed and the long-dashed curves do not happen at the same time, the "level-comparison" above, in practice, is accomplished by comparing the short dashed curve or the long-dashed curve against the horizontal-dashed line in FIG. 2. This horizontal-dashed line level, which is known as the "expected value" of the peak marked as P in FIG. 2, is adjusted by another loop to be the average of the short-dashed and long-dashed curves at the sampling point. This level is also known as the error-slicer level.

It should be noted that the Mueller-Muller CDR algorithm does not work with a data pattern that looks like a 2-UI-cycle-time clock (e.g. a 010101 . . . timing pattern). A CDR technique capable of supporting the clock pattern is necessary to pass a CJTPAT test required by many protocols. However, because there is no way for the Mueller-Muller CDR algorithm to distinguish between the bending coming from pre-cursor ISI and the bending coming from the post-cursor ISI, where both are always present at the same time, the Mueller-Muller CDR technique could not be used to detect the clock pattern. For a transition to have a contribution in the Mueller-Muller CDR algorithm, at least one side of the transition (i.e. the bit before or the bit after) has to be a repeated bit. Therefore, because not all transition are utilized, the Mueller-Muller CDR algorithm has lower detection "gain" as compared to that of Alexander CDR algorithm.

Figure 3:
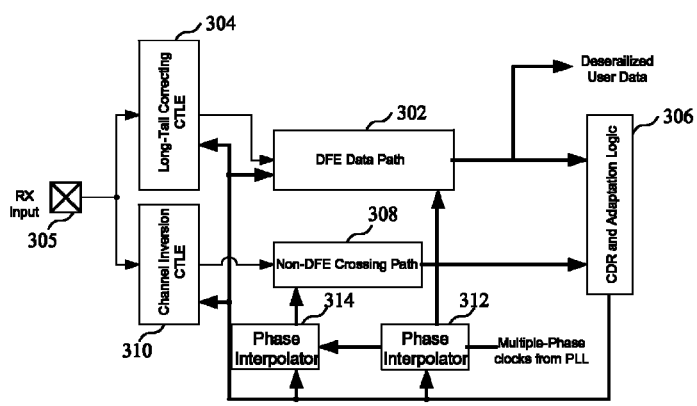
FIG. 3 is a block diagram of a circuit enabling the reception of data in an integrated circuit.

Turning now to FIG. 3, a block diagram of a circuit enabling the reception of data in an integrated circuit is shown. In particular, a data path 302, which may be a decision feedback equalizer (DFE) data path for example, is coupled to receive the output of a linear equalizer 304, shown here as a CTLE, and more particularly a long-tail correcting CTLE. The data path 302 generates deserailzed user data. A receiver input data signal is received at an input 305 and coupled to the linear equalizer 304. A CDR and Adaptation Logic circuit 306 is coupled to the output of the data path 302. A second path 308 is also coupled the received input data stream, where the second path is used to adjust a clock phase offset, as will be described in more detail below. The second path 308 comprises a Non-DFE Crossing Path which is coupled to an output of a second linear equalizer 310, shown here as a channel inversion CTLE. Because the input waveform at input 305 at any given time is made of overlapping ISIs from various bits before the current bit and a faint signal from the current bit, equalization of the signal eliminates the ISIs and makes the faint current bit stand out. At that point, an eye of the signal is identified to determine major and minor crossings, peaks, etc. As will be described in more detail below, the CDR and Adaptation Logic receive outputs of the capture flip-flops after a waveform is moved up or down by some amount as a part of an unrolling action.

A first phase interpolator 312 is coupled to provide a first clock signal to the data path 302, and a second phase interpolator 314 is coupled to provide a second clock signal to the second path 308. Each of the phase interpolators is coupled to receive multiple phases of a clock signal from a phase-locked loop (PLL) circuit. More details related to the phase interpolators and a PLL circuit are provided in FIGS. 5 and 6.

Linear Equalization, such as equalization provided by a CTLE circuit or a feed-forward-equalizer (FFE) for a discrete-time design, is a low cost (i.e. low in power and complexity) equalization scheme which simply boosts signal strengths in the high frequency regions, such as with a high-pass filter to "invert" the transfer function of the backplane loss. This process boosts the unwanted high frequency noises along with the wanted high frequency signals. It should be noted that the term "noises" is intended to include other non-idealities such as cross-talks and reflections. This boosting effect is known as "noise-coloring." Noise coloring transforms a noise impulse (at the equalizer input) to a waveform of a different shape (at the equalizer output) which is the impulse response of the CTLE. Because the impulse response of the CTLE circuit extends beyond a single bit boundary, the transformed "noises" are no longer "pure" noises. That is, the noise contains extra energy contents that can be "predicted" by observing noises in the past. For this reason, a CTLE-only design leads to a sub-optimal signal-to-noise ratio (SNR), and thus a sub-optimal bit error rate (BER). Linear equalization is, thus, only suitable in a low loss environment when noise-coloring from boosting can be tolerated.

However, by providing a DFE data path as shown in FIG. 3, performance is improved. DFE is an equalization scheme which is beneficial in a high-loss environment. In a DFE design, a post-cursor ISI is canceled by an ISI-correction signal that is made of a scaled version of a past decision. Therefore, the effects of the non-idealities described above are blocked in the "0" or "1" decision process. In other words, if the "0" or "1" decision is made correctly, the after-decision data bit will be as clean as the un-contaminated original data bit inside the transmitter. This cleaned-up bit can then be used to synthesize a noise-free DFE correction signal inside the receiver for equalization. The past bits are stored in a DFE finite impulse response (FIR) circuit, which is a digital delaychain with tapped and weighted outputs. This way, spectrums of non-idealities at inputs of capture registers or flip-flops (where the "0" or "1" decisions are made) can be kept the same as the spectrum of noises at the RX input pads (i.e. no "coloring"). This property of DFE equalization (i.e. where non-idealities signals are not colored), gives the circuit having a DFE circuit a superior SNR and thus BER performance.

Figure 4:
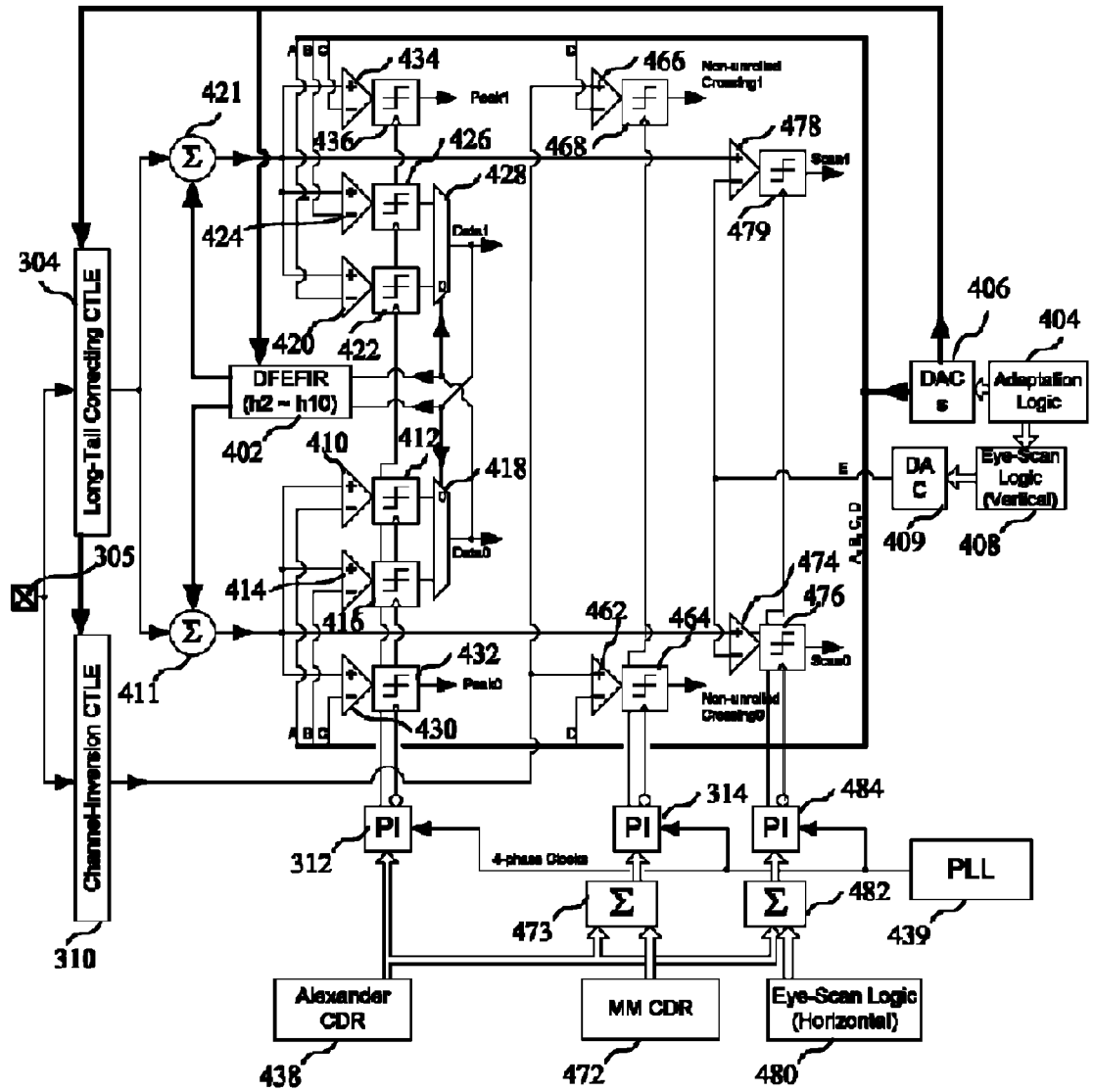
FIG. 4 is another block diagram of a circuit enabling the reception of data in an integrated circuit.

Turning now to FIG. 4, a block diagram of another circuit enabling the reception of data in an integrated circuit is shown. The circuit of FIG. 4 is based upon the circuit of FIG. 3, but particularly discloses a DFEFIR filter 402 which is coupled to receive various inputs. In particular, adaptation logic 404 is coupled to digital-to-analog converters (DACs) 406, the output of which is coupled to the DFEFIR filter 402. The DACs 406 generate signals designated A-D, where A=−UT, B=+UT, C=+/−UT+Vpeak, and D=0. Vertical eye-scan logic 408 is also coupled to a DAC 409, which generates a value E=−/+UT−/+Vscan.

It should be noted that the h2~h10 of the DFEFIR filter 402 are automatically set, such as by the minimum mean square error (MMSE) algorithm using the "peak" information (as is well known in the art) and h1 is designated as UT. The MMSE enables the values on the DFE feedbacks (i.e. the strength of each tap) to be chosen such that any previous data bit, on average, has no correlation to the current bit's peak-slicing outcome. If the MMSE algorithm sees that this is not true for a tap, then it will adjust that tap to make it true. UT is adapted in the same way as the h2~h10 values are adapted, but the first DFE tap is very expensive to equalize and is therefore separately designated as UT. If unrolling (which will be described in more detail below) is not used on the h1, the timing requirement will not be met. Accordingly, the UT value is adapted to the channel loss. If the transmitter is right next to the receiver, the UT value will be (automatically) adjusted to 0. If the channel is at the maximal loss supported, for example 30 dB of loss, the UT will be set to its maxima (about 150 mV).

A comparator 410 receives the signal A and an output of a summing circuit 411, which receives an output of the DFE-FIR filter 402 and the output of the linear equalizer 304. The output of the comparator 410 is coupled to a register 412. A comparator 414 is coupled to receive signals B and the output of the summing circuit 411. The output of the comparator 414 is coupled to a register 416. The outputs of each of the registers 412 and 416 are coupled to a multiplexer 418, the output of which is a data0 signal. Similarly, a comparator 420 receives the signal A and an output of a summing circuit 421, which also receives an output of the DFEFIR filter 402 and the output of the linear equalizer 304. The output of the comparator 420 is coupled to a register 422. A comparator 424 is coupled to receive signals B and the output of the summing circuit 421. The output of the comparator 424 is coupled to a register 426. The outputs of each of the registers 422 and 426 are coupled to a multiplexer 428, the output of which is a data1 signal. Accordingly, the data0 and data1 signals are generating using one of two CDR circuits which generates clock signals having the appropriate timing for receiving the data of the input data stream.

A comparator 430 is coupled to receive the C signal and the output of the summing circuit 411. The output of the comparator 430 is coupled to a register 432, the output of which is a peak0 signal. Similarly, a comparator 434 is coupled to receive the C signal and the output of the summing circuit 421. The output of the comparator 434 is coupled to a register 436, the output of which is a peak1 signal. The purpose of peak0 and peak1 are to provide timing for the Mueller-Muller CDR, and to provide an "error" signal for the adaptation logic 404 to find out the optimal settings of equalization. Accordingly, peak0 and peak1 have the dual-purpose of enabling data recovery (such as by using an Alexander CDR circuit), and efficiently determining a phase offset (such as by using a Mueller-Muller CDR) by reusing information that is already available for data recovery.

A first CDR circuit 438, shown here as an Alexander CDR circuit, is coupled to the phase interpolator 312, the outputs of which are clock signals which are coupled to control the registers 412, 416, 422, 426, 432, and 436 as shown. The Alexander CDR circuit recovers the clock signal by analyzing the input data signal and determining an appropriate phase of the clock provided by the PLL 439 which is used to receive data. While an Alexander CDR circuit may be implemented for reasons set forth below, it should be understood that other CDR circuits detecting minor crossings could be implemented which can accurately extract a clock signal from the data.

A second CDR circuit is implemented to enable adjusting a clock phase offset. In particular, a comparator 462 is coupled to receive the D signal and an output of the second linear equalizer 310. An output of the comparator 462 is coupled to a register 464, which generates a non-unrolled Crossing0 signal. Similarly, a comparator 466 is coupled to receive the D signal and an output of the second linear equalizer 310. An output of the comparator 466 is coupled to a register 468, which generates a non-unrolled Crossing1 signal. An output of a second CDR circuit 472, shown here as a Mueller-Muller CDR circuit, and the output of the first CDR circuit 438 is coupled to a summing circuit 473. An output of the summing circuit 473 and a clock from the PLL 439 is coupled to the phase interpolator 314. While the second circuit 472 is shown as a Mueller-Muller CDR circuit, it should be understood that other CDR circuits, and particularly CDR circuits using minor crossings to extract clock signals, could be used.

Scan values associated with eye scanning is also performed. A comparator 474 is coupled to an output of the summing circuit 411 and the output signal E generated by the DAC 409. An output of the comparator 474 is coupled to a register 476 to generate a scan0 signal. Similarly, a comparator 478 is coupled to an output of the summing circuit 421 and the output signal E generated by the DAC 409. An output of the comparator 478 is coupled to a register 479 to generate a scan1 signal. Horizontal eye-scan logic 480 is coupled to a summing circuit 482, which also receives the output of the first CDR circuit 438. A phase interpolator 484 receives an output of the summing circuit 482 and generates output clock signals which are coupled to the registers 476 and 479. The scan1 and scan0 are there to provide data capturing results with a certain amount of offsets (relative to the normal operations) in addition to the normal operation capturing (done with data1 and data0). For example, if an offset x is added and the scan1 and data1 are always the same, there is no error. But, if we add an offset y, and the scan1 and the data1 can sometimes be different (i.e. there are errors), then the margin of getting a bit-error is between x and y, where can be either horizontal or vertical. This knowledge is only used for eye-scan, and is not truly necessary during normal operations.

An Alexander CDR captures results at a point right between two real user data. In other words, they need to be "out of phase" from data. Accordingly, the "peak's" clocks are the same clocks that also drive the "data," as shown in FIG. 4, where the difference between peak and data are only in their vertical slicing levels. Peak has an extra offset to make it detect the peak. The Alexander CDR circuit needs something from a separate phase-interpolator to deliver the clocks that are positioned between data (i.e. major crossings). An important aspect of FIG. 4 is that the "out of phase" requirement (of the first CDR circuit 438 and the second CDR circuit 472) does not need to be out by 90 degrees. The 90-degree phase difference is applicable when everything (both data and crossings) are coming out from the same equalization circuit, which is costly. Further, if it is desirable to cut-corners on the crossings (because having bit errors at the crossings is acceptable where the CDR that operates on the "average"), then 90 degree is not the right value anymore. Accordingly, the Mueller-Muller circuit can pick a new value to replace the 90-degree value in the circuit of FIG. 4. The Mueller-Muller will pick this new value such that, on average, its early-late ratio matches up with Alexander's early-late ratio (i.e. 50/50 when in lock).

Accordingly, the circuits of FIGS. 3 and 4 reduce circuit requirements and improve performance by selectively implementing different equalizers and clock and data recovery circuits in different portions of a data receiver implemented in an integrated circuit. More particularly, by implementing separate CDR circuits to perform the separate functions of receiving data and adjusting a clock phase offset, the circuit performance is optimized. That is, separate CDR circuits and linear equalizers are implemented to perform different tasks for which they are best suited. The channel-inversion CTLE 310 and the long-tail correction CTLE 304 are selected based upon the frequency range that they are boosting. The channel-inversion CTLE 310 equalizes against all losses in the entire frequency range of interest, from DC to the data rate divided by 2. Long-tail correcting CTLE 304 only equalizes against low frequency losses, from DC to about a decade below the data rate divided by 2, and leaves the high frequency losses for the DFE to correct. The DFE cannot equalize those low frequency losses because a DFE may not have a sufficient number of taps, which may be approximately 50 taps for example.

In implementing the DFEFIR filter 402 of FIG. 4, the number of DFE taps (i.e. the DFEFIR length) of a design is limited by its budget of parasitic junction capacitance on the summing nodes. Another factor that limits the number of taps is the area of the adaptation logic and DACs that set the correction strengths. The total tap number in a design is typically kept below 15. Because it is not practical to equalize all post-cursor ISIs with DFE filters (which may require more than 100 of them for a high-loss case), the loss in the low frequency region (i.e. the long tail ISIs in the single-bit response beyond the DFE coverage) of the DFE design is still equalized by a low-boosting-gain CTLE that only corrects for the long tail (not inverting the entire channel loss).

In a very high-speed Serdes circuits, the cost of DFE is pushed up even higher by the necessity of an "unrolling" (or called "speculative") scheme to relax the timing constraints of the decision-feedback path's first-bit. Unrolling breaks the timing constraint by implementing redundant resources (e.g. providing extra capture flip-flops). Capture registers, which may be implemented as flip-flops, are duplicated and wired to two different decision thresholds (known as unroll-threshold, or UT, for short). One decision threshold is dedicated for the case when the previous bit is a 0, while the other is dedicated for the opposite case where the previous bit is a 1. Because it is not known in advance which threshold is required, both possibilities are covered. The selection of the final decision outcome occurs at some time after the decisions are made. The use of the unrolling scheme increases the power of the front-end (i.e. the CTLE) because the loading of the front-end is increased.

A DFE design with 1-bit unrolling may be implemented with "right-crossing" Alexander CDR. In order to use the Alexander CDR, the crossing needs to be equalized the same way the data is equalized (i.e. has also gone through unrolling). "Right crossing" here means we are using the right-hand-side (or later-in-time) crossing that is unrolled by the same "previous-bit" information as the data bit is unrolled, where the unroll selection signal of the crossing is delayed by an extra latch to avoid the hold time problem. To meet the clock-pattern requirement of the CJTPAT, a non-unrolling version of the crossing is captured.

Since no crossing is needed in a Mueller-Muller CDR circuit, the design is simpler. However, a Mueller-Muller CDR circuit has a limitation of not working with the clock-pattern and a much reduced phase-detection gain. That is, about ⅞ of all data transitions cannot be utilized by the Mueller-Muller CDR of this design. Half of the transitions are not used because they don't meet the rule of at least one-side of the transition has to be a repeated bit. Half of the remaining transitions are also not used because there are no redundant capture-flip-flops in the peak-slicer (i.e. error-slicer). So, it needs to do time-multiplexing on the unroll-threshold. In the remaining quarter of the transitions, the final half is not used because only the "peak" (i.e. the current data must be a 1) is detected, but not the "valley". Accordingly, this scheme leads to an extremely slow CDR loop that will not meet jitter-tolerance requirements of most protocols. It is, however, not a problem for the Mueller-Muller CDR to track a slow phase drifting in the reference clock as in the circuit of FIG. 4.

The payload data are equalized with an unrolling DFE in FIG. 4 to ensure a good SNR, while a separate, dedicated CTLE (such as a channel-inversion CTLE) is used for the two crossing slicers which are not unrolled. It is similar to a CTLE-only design that saves power by avoiding unrolling circuits on the crossings, but the channel inversion CTLE (which is based on heavy averaging and has a poor SNR) only drives the crossing slicers which are allowed to have some low-level bit error rates without degrading the CDR functionality. The payload data's SNR is not affected. Unlike conventional devices, the data path and the crossing path of the circuit of FIGS. 3 and 4 are not required to match each other in the timing (i.e. because the clock phase offset between the data clock and the crossing clock is not fixed to 90-degrees as in conventional devices). Rather, it is automatically adjusted to an optimal value picked by the Mueller-Muller CDR circuit in the circuit of FIG. 4.

It should be noted that there are two kinds of "clock phase offset": systematic and random, each of which will be addressed. Because the data signal and crossing signal to be strobed by the clocks to drive the Alexander CDR and Mueller-Muller CDR circuits are generated by different equalization circuits, a systematic clock phase offset between the circuits must be addressed. Assuming everything matches, the ideal data-clock to crossing-clock distance is "as far away as possible". Data-clock fires every 180-degree (we have data1 to be acquired at phase of 0-degree and data0 to be acquired at phase of 180-degree). So, the ideal crossing clock location for the crossing1 is 90 degree lagging behind the clock of data1. When the data clock phase moves (as a result of Alexander CDR tracking) the crossing clock phase moves by the same amount as well.

Figure 7:
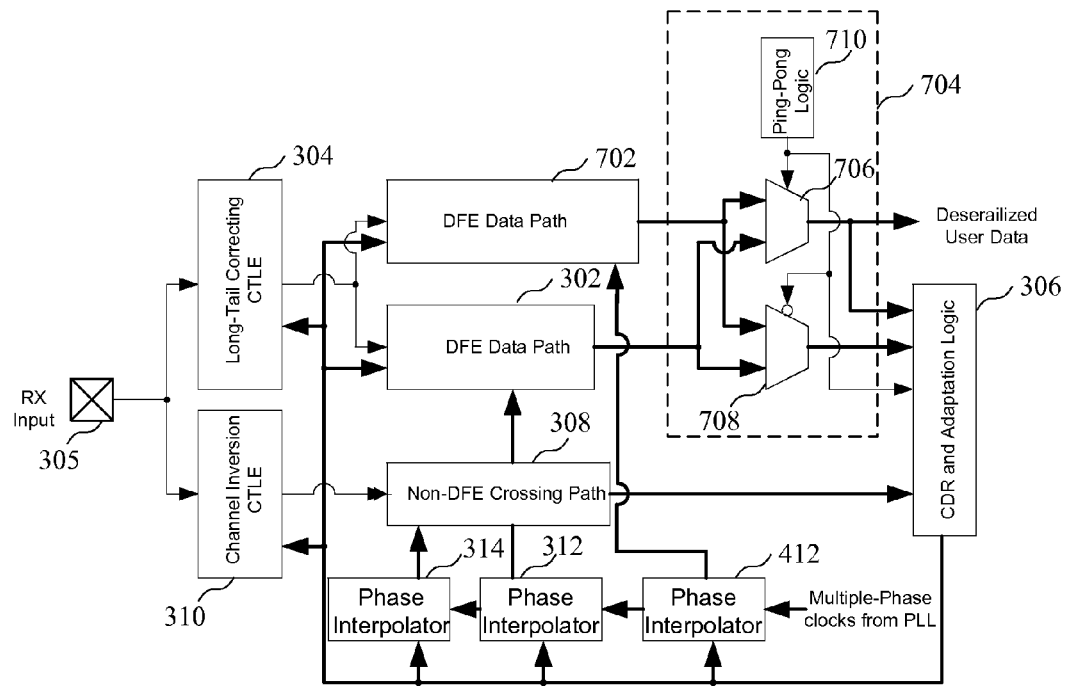
FIG. 7 is a block diagram of a circuit having multiple data paths which enable the reception of data in an integrated circuit.

The circuit for generating data has a DFE, has unrolling, and has a long-tail CTLE. On the other hand, the crossing's circuit does not have a DFE, has no unrolling, and has CTLE that enables the inversion of the entire channel (both high frequency and low frequency losses are inverted rather than just inverting the low frequency long-tail as with the data circuit). Therefore, there are two copies of the input data with an unknown distance (or timing offset) between them, where this difference may be designated as Delta-T (i.e. a positive value if the DFE path is lagging relative to the channel-inversion CTLE path). The "data" is acquired from the first copy and the crossing is acquired from the second copy. Accordingly, the clock used for data and the clock used for the crossing should be (90-degree minus the Delta-T) apart, rather than just 90-degree apart. The job of the Mueller-Muller CDR (which runs on the data and the peak) is to find this 90-degrees minus the Delta-T value, which will depend on the channel loss, temperature and voltage. There is no reliable way to determine the Delta-T in advance. Because these three factors are not changing quickly with time, the Delta-T happens to be what Mueller-Muller is capable of tracking. Accordingly, if both Alexander and Mueller-Muller loop circuits are used as shown in FIG. 7, the data path and the crossing path do not need to be the same anymore, and the crossing path can be implemented more cheaply. The systematic clock phase offset (i.e. the 90-degree minus the Delta-T value) is automatically adapted to match that between the data and the crossing (due to the use of different equalization circuits). That is, the systematic clock phase offset of FIG. 4 comes from the fact that data and crossing have different timing, due to different circuits that generate them.

Figure 5:
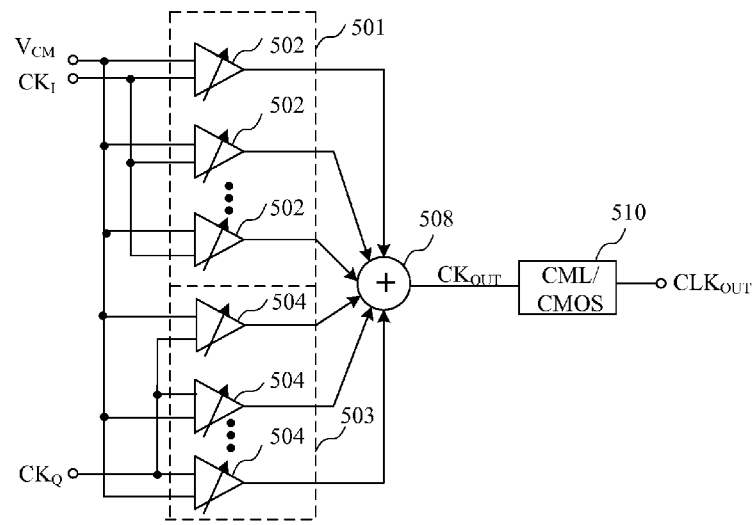
FIG. 5 is a block diagram of a phase interpolator.

Turning now to FIG. 5, a block diagram of a phase interpolator is shown. According to the circuit of FIG. 5, a first set of DACs 501 comprises I-DACs 402 which are coupled to receive both a first phase $CK_I$ of an input clock and a common mode voltage $V_{CM}$. As will be described in more detail below, the common mode voltage will be used to generate a common mode output signal at the output of a DAC which is not selected to contribute to the output clock signal of the phase interpolator. A second set of DACs 503 comprises Q-DACs 504. The Q-DACs each receive an second phase $CK_Q$ of the input clock signal and the common mode voltage VCM.

Each of the DACs of FIG. 5 is configured to select one of the two inputs to the DAC. Therefore, each of the I-DACs and the Q-DACs will output a common mode output (i.e. an output having the same voltage on the differential outputs nodes, or a zero differential output) or a differential clock signal based upon the $CK_I$ or $CK_Q$ clock signals, respectively. The outputs of all of the DACs are provided to summing circuit 508 which adds the various output clock signals to generate the output clock signal $CK_{OUT}$ of the phase interpolator. The voltage of the output clock signal optionally may then be converted to another voltage. For example, the clock signal may be converted from a first voltage by a voltage converter 510, such as a CKL-to-CMOS voltage converter, to an output clock signal $CLK_{OUT}$ having a second voltage.

Figure 6:
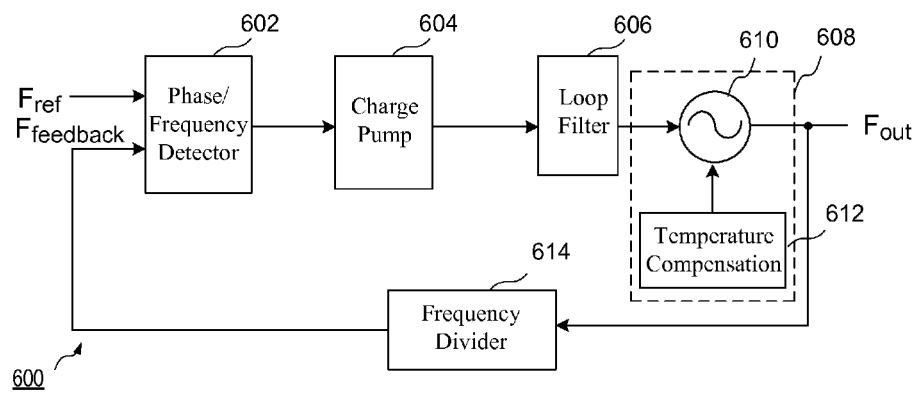
FIG. 6 is a block diagram of a phase locked loop.

Turning now to FIG. 6, a block diagram of a phase locked loop (PLL) is shown. PLL 600 exemplifies a charge-pump based PLL, which is a PLL design implementation that facilitates flexible design tradeoffs by decoupling various design parameters, such as loop bandwidth, damping factor, and lock range. PLL 600 consists of a phase/frequency detector 602 that receives a reference signal $F_{ref}$ and a feedback signal $F_{feedback}$, a charge pump 604, and a loop filter 606 coupled to the resonator circuit 608 which generates an output signal $F_{out}$. The resonator circuit 608 includes an oscillator circuit 610 and a temperature compensation circuit 612.

Clock division may be necessary, for example, when the frequency of the output signal $F_{out}$ of the tunable resonant circuit 608 is operating in a high frequency range, such as 5 gigahertz (GHz), but reference signal $F_{ref}$ may only be operating at a relatively low frequency range, such as 156.25 megahertz (MHz). Accordingly, frequency divider 614 enables generating a signal having a lower frequency, as is well known in the art. In operation, phase/frequency detector 602 supplies digital signals, e.g., UP and DN, and their complementary signals, e.g., $\overline{UP}$ and $\overline{DN}$, corresponding to a phase/frequency error between $F_{ref}$ and $F_{feedback}$ output by the frequency divider 614. For example, if the phase/frequency of $F_{feedback}$ is lagging the phase/frequency of $F_{ref}$, then the pulse width of signal UP may be increased and the pulse width of signal DN may be decreased to cause the phase/frequency of the resonator circuit 600 to be advanced in phase/frequency. Conversely, if the phase/frequency of $F_{feedback}$ is advanced with respect to the phase/frequency of signal $F_{ref}$, then the pulse width of signal UP may be decreased and the pulse width of signal DN may be increased to cause the phase/frequency of the resonator circuit 608 to be retarded in phase/frequency.

Charge pump 604 reacts to the phase/frequency error signals output by the phase/frequency detector 602 by generating a current signal. For example, if the pulse width of signal UP is increased, the magnitude of the current signal may also increase. Conversely, if the pulse width of signal DN is increased, then the magnitude of the current signal may also decrease. The current signal is then converted into an error voltage, $V_{error}$, by loop filter 606, which is then supplied to resonator circuit 608 to set the output frequency, $F_{out}$, of the resonator circuit 608. $V_{error}$ may control one or more capacitors of the resonator circuit 608, for example. Through negative feedback, the phase/frequency error between $F_{ref}$ and $F_{feedback}$ is forced to be substantially zero through operation of the resonator circuit 608.

Turning now to FIG. 7, a block diagram of a circuit having multiple data paths which enable the transmission of data in an integrated circuit is shown. The receiver design of FIG. 7 is made of two identical, self-contained data paths. The two paths include the first data path 302 and the second data path 702 and are connected to a shared long-tail-correcting CTLE 304. In each path, two summing nodes (i.e. even and odd summing nodes) are used. On each summing node, there are two capture flip-flops (i.e. unroll-up and unroll-down). Therefore, each path 302 and 702 have 4 capture flip flops which are connected as in FIG. 4 (i.e. the capture registers 412, 416, 422, and 426), where the DFEFIR feedback data of a path is taken from the path itself. A control circuit 704 comprises a pair of multiplexers 706 and 708 which are controlled by ping-pong logic to enable compensating for a random clock phase offset.

The two paths will alternate being the "mission" path that provides user data. When a path is not the mission path, it serves as a timing path (in a "schmooze" mode) that provides the DFE adaptation info (i.e. the error-slicing outputs) and performs the search of the optimal timing location (i.e. the offset from the crossing) that maximizes the data capturing margins. The mapping of which path plays which role will be controlled by the ping-pong logic 710 that toggles slowly. The optimal timing location of a path found when it serves as the timing path will be used when it serves as the mission path. The de-serialized data will be multiplexed to reach their perspective destinations depending on the state of the ping-pong logic. There is no high-speed (synchronous) multiplexing needed, and the Alexander CDR (driven by the Non-DFE crossings) is shared by both paths. Each path uses the timing mode to pick its optimal clock phase offset.

This form of the implementation of the invention offers the same benefits as described in the previous section. In addition, this design offers on-the-fly tracking of the clock phase offset. Further, in a schmooze mode, the BER contour (i.e. BER as a function of vertical (i.e. voltage) and horizontal (i.e. clock timing) offsets) can be searched exhaustively (i.e. all possible coordinates of sampling points are tested). So, the final margin of this approach is no longer subject to the horizontal offset problem of the Mueller-Muller CDR when the leading edge and the trailing edge of the eyes have different slew rates.

The circuit of FIG. 7 reduces the impact of the "random" offset which exists on top of the systematic offset. Even for the circuits that look exactly matched in their designs and layouts, some mismatches will still be introduced by the manufacturing processes, which are often called "Monte-Carlo" mismatches to emphasize their uncontrollability. Assuming that everything is ideal in the circuit arrangement of FIG. 7 except the two peak-slicers have some extra delays in their clocks (relative to the clocks of the data) because of the Monte-Carlo mechanism above, it is possible to detect and correct those Monte-Carlo mismatches. More particularly, it is possible to perform a manual override of a code (after the CDR or adaptation loop that generate the code has settled) to find out the true margin of the silicon (after the Monte-Carlo effects are baked into a particular channel of a particular chip). The "later-than-ideal" peak-slicer horizontal (timing) locations above will result in a reduced margin on the left side of the eye (as compared to the right side of the eye). So, if the Mueller-Muller CDR code is overridden to a less value, it is possible to gain back on the margin.

However, in order to know what value to override to in order to gain back the margin, it is necessary to have a trial-and-error process to find out. The output code of the Mueller-Muller CDR is scanned until a bit-failure generated on one side is seen (e.g. a code "abc") and another failure is seen on the other side (e.g. a code "xyz"). If the Monte-Carlo mismatch above does not exist, we should see the Mueller-Muller CDR picks a code very close to (abc+xyz)/2. In a real case, it can be misled away from this (abc+xyz)/2 optimal value because of the Monte-Carlo mismatch (i.e. the peak-slicer outcomes are biased). These "trial-and-error" processes are not too difficult to implement if it is only done once. Unfortunately, the mismatch can drift in time with changes in the temperature or voltage. Therefore, this calibration process (called schmoozing) needs to be run in real time. Because generating bit-error is not an option, we need two pieces of the (identical) hardware to take turn in grabbing the user data so we can hide the bit-errors from users as we do the schmoozing on the temporarily "de-commissioned" path.

Figure 8:
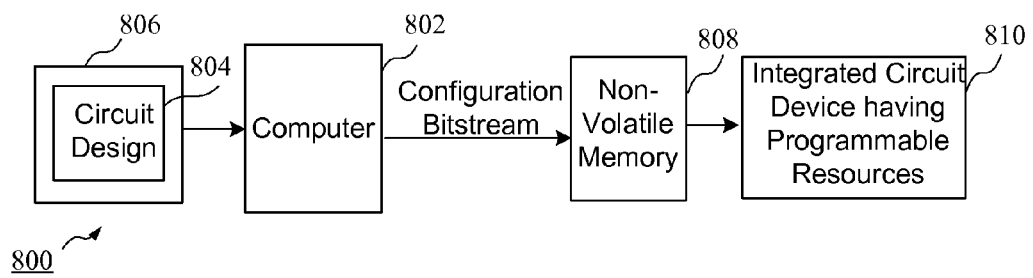
FIG. 8 is a block diagram of a system for programming a device having programmable resources.

Turning now to FIG. 8, a block diagram of a system for programming a device having programmable resources according to an implementation is shown. In particular, a computer 802 is coupled to receive a circuit design 804 from a memory 806, and generates a configuration bitstream which is stored in the non-volatile memory 806. As will be described in more detail below, the circuit design may be a high level design, such as a circuit design defined in a hardware description language (HDL). Also, the computer may be configured to run software that generates a configuration bitstream which is stored in the non-volatile memory 808 and provided to an integrated circuit 810 which may be a programmable integrated circuit, such as the integrated circuit described below in FIG. 9. As will be described in more detail below, bit of the configuration bitstream are used to configure programmable resources of the integrated circuit.

Figure 9:
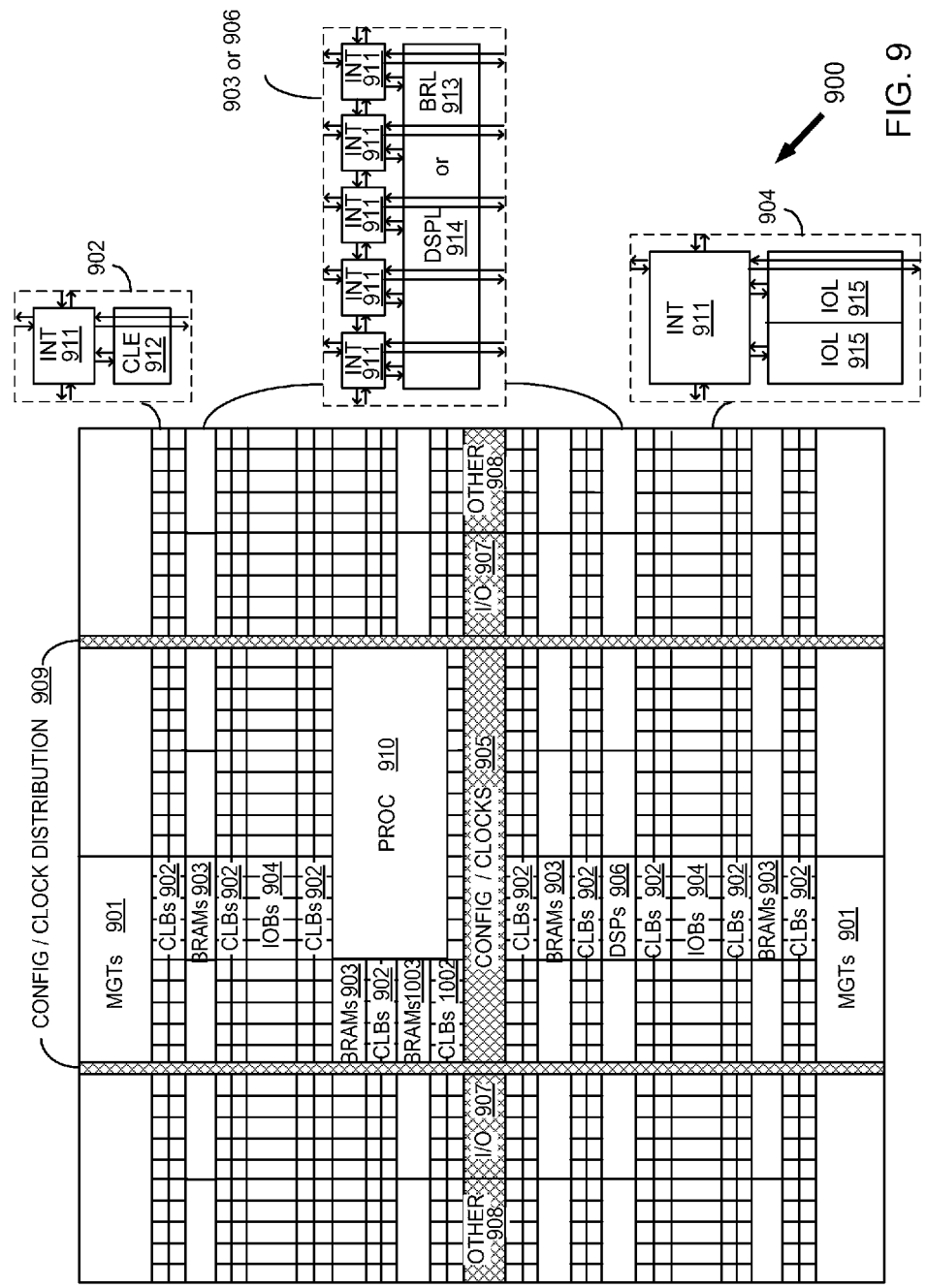
FIG. 9 is a block diagram of a device having programmable resources which may implement the circuits of FIGS. 1-7.

Turning now to FIG. 9, a block diagram of a device having programmable resources including the circuits of FIGS. 1-7 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 9 comprises an FPGA architecture 900 having a large number of different programmable tiles including multi-gigabit transceivers (MGTs) 901, CLBs 902, random access memory blocks (BRAMs) 903, input/output blocks (IOBs) 904, configuration and clocking logic (CONFIG/CLOCKS) 905, digital signal processing blocks (DSPs) 906, specialized input/output blocks (I/O) 907 (e.g., configuration ports and clock ports), and other programmable logic 908 such as digital clock managers, analog-to-digital converters, system monitoring logic, and so forth. Some FPGAs also include dedicated processor blocks (PROC) 910, which may be used to implement a software application, for example.

In some FPGAs, each programmable tile includes a programmable interconnect element (INT) 911 having standardized connections to and from a corresponding interconnect element in each adjacent tile. Therefore, the programmable interconnect elements taken together implement the programmable interconnect structure for the illustrated FPGA. The programmable interconnect element 911 also includes the connections to and from the programmable logic element within the same tile, as shown by the examples included at the top of FIG. 9.

For example, a CLB 902 may include a configurable logic element (CLE) 912 that may be programmed to implement user logic plus a single programmable interconnect element 911. A BRAM 903 may include a BRAM logic element (BRL) 913 in addition to one or more programmable interconnect elements. The BRAM includes dedicated memory separate from the distributed RAM of a configuration logic block. Typically, the number of interconnect elements included in a tile depends on the height of the tile. In the pictured implementation, a BRAM tile has the same height as five CLBs, but other numbers may also be used. A DSP tile 906 may include a DSP logic element (DSPL) 914 in addition to an appropriate number of programmable interconnect elements. An IOB 904 may include, for example, two instances of an input/output logic element (IOL) 915 in addition to one instance of the programmable interconnect element 911. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured implementation, a columnar area near the center of the die is used for configuration, clock, and other control logic. The config/clock distribution regions 909 extending from this column are used to distribute the clocks and configuration signals across the breadth of the FPGA. Some FPGAs utilizing the architecture illustrated in FIG. 9 include additional logic blocks that disrupt the regular columnar structure making up a large part of the FPGA. The additional logic blocks may be programmable blocks and/or dedicated logic. For example, the processor block PROC 910 shown in FIG. 9 spans several columns of CLBs and BRAMs.

Note that FIG. 9 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual FPGA more than one adjacent column of CLBs is typically included wherever the CLBs appear in order to facilitate the efficient implementation of user logic. While the implementation of FIG. 9 relates to an integrated circuit having programmable resources, it should be understood that the circuits and methods set forth in more detail below could be implemented in any type of ASIC.

Figure 10:
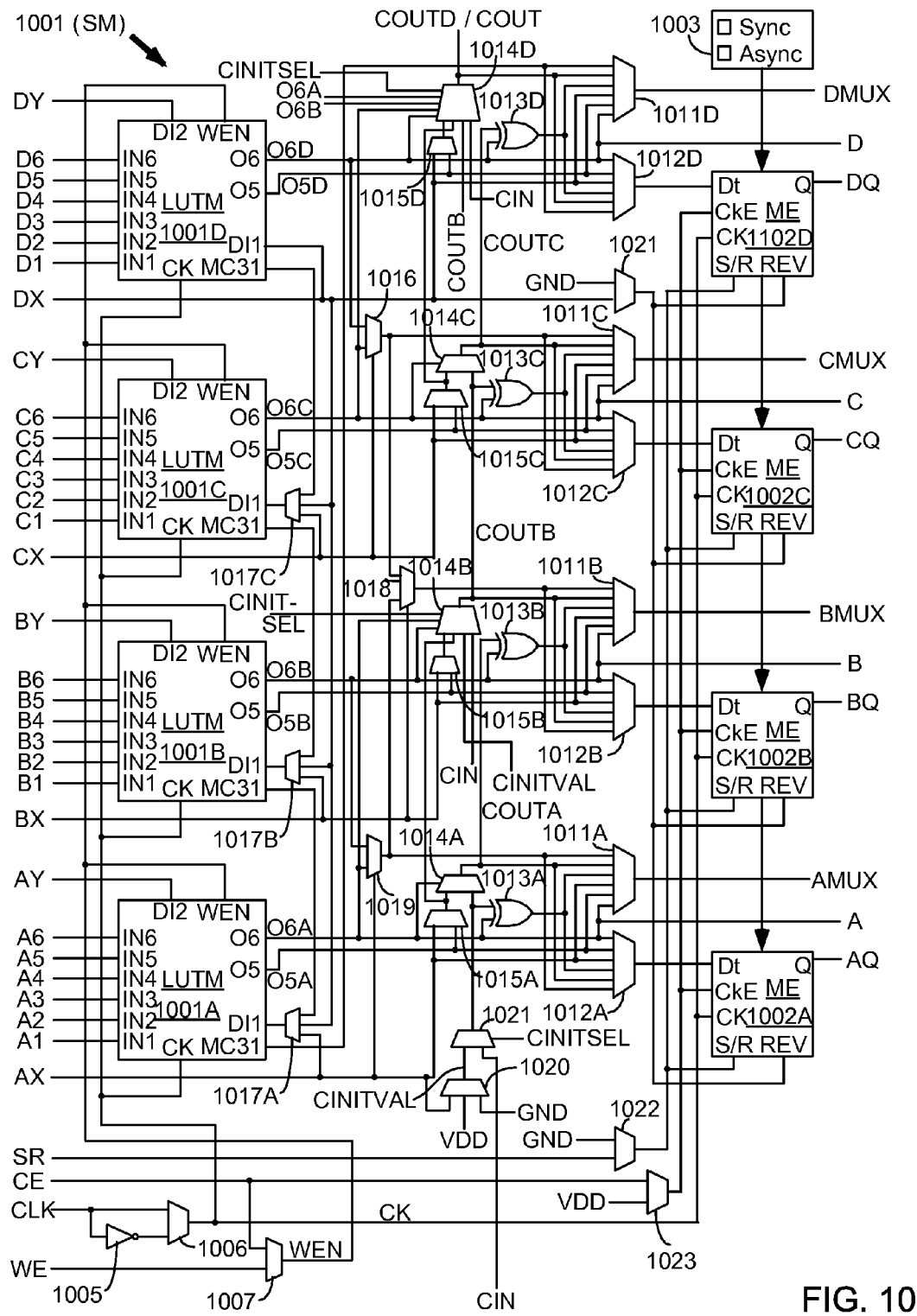
FIG. 10 is a block diagram of a configurable logic element of the device of FIG. 9.

Turning now to FIG. 10, block diagram of a configurable logic element of the device of FIG. 9 is shown. In particular, FIG. 10 illustrates in simplified form a configurable logic element of a configuration logic block 902 of FIG. 9. In the implementation of FIG. 10, slice M 1001 includes four lookup tables (LUTMs) 1001A-1001D, each driven by six LUT data input terminals A1-A6, B1-B6, C1-C6, and D1-D6 and each providing two LUT output signals O5 and O6. The O6 output terminals from LUTs 1001A-1001D drive slice output terminals A-D, respectively. The LUT data input signals are supplied by the FPGA interconnect structure via input multiplexers, which may be implemented by programmable interconnect element 1011, and the LUT output signals are also supplied to the interconnect structure. Slice M also includes: output select multiplexers 1011A-1011D driving output terminals AMUX-DMUX; multiplexers 1012A-1012D driving the data input terminals of memory elements 1002A-1002D; combinational multiplexers 1016, 1018, and 1019; bounce multiplexer circuits 1022-1023; a circuit represented by inverter 1005 and multiplexer 1006 (which together provide an optional inversion on the input clock path); and carry logic having multiplexers 1014A-1014D, 1015A-1015D, 1020-1021 and exclusive OR gates 1013A-1013D. All of these elements are coupled together as shown in FIG. 10. Where select inputs are not shown for the multiplexers illustrated in FIG. 10, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 10 for clarity, as well as from other selected figures herein.

In the pictured implementation, each memory element 1002A-1002D may be programmed to function as a synchronous or asynchronous flip-flop or latch. The selection between synchronous and asynchronous functionality is made for all four memory elements in a slice by programming Sync/Asynch selection circuit 1003. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1002A-1002D are clocked by a clock signal CK, which may be provided by a global clock network or by the interconnect structure, for example. Such programmable memory elements are well known in the art of FPGA design. Each memory element 1002A-1002D provides a registered output signal AQ-DQ to the interconnect structure. Because each LUT 1001A-1001D provides two output signals, O5 and O6, the LUT may be configured to function as two 5-input LUTs with five shared input signals (IN1-IN5), or as one 6-input LUT having input signals IN1-IN6.

In the implementation of FIG. 10, each LUTM 1001A-1001D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1017A-1017C for LUTs 1001A-1001C), or to the two 32-bit RAMs via input terminals DI1 and DI2. RAM write operations in the LUT RAMs are controlled by clock signal CK from multiplexer 1006 and by write enable signal WEN from multiplexer 1007, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1001A may also be provided to the general interconnect structure for shift register chaining, via output select multiplexer 1011D and CLE output terminal DMUX. Accordingly, the circuits and methods set forth above may be implemented in a device such as the devices of FIGS. 9 and 10, or any other suitable device.

Figure 11:
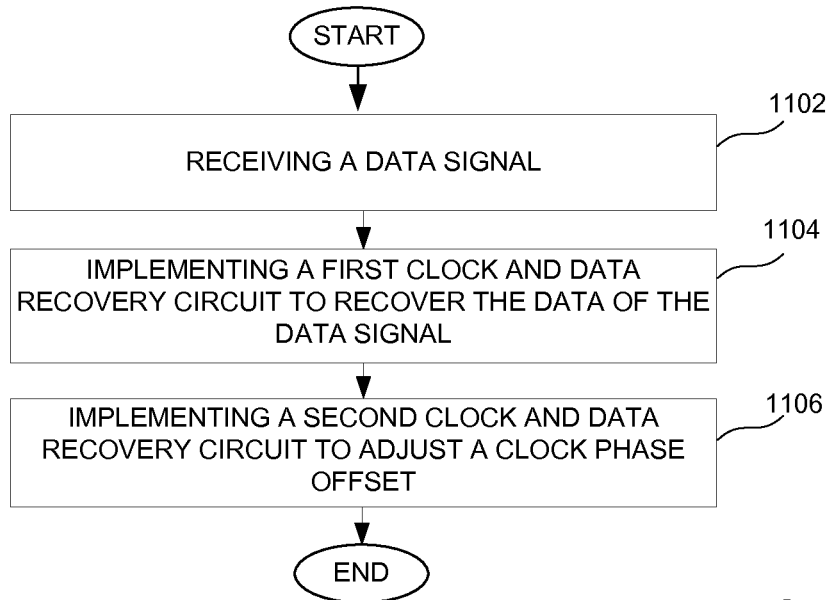
FIG. 11 is a flow diagram showing a method of transmitting data in an integrated circuit.

Turning now to FIG. 11, a flow chart shows a method of implementing a data receiver in an integrated circuit. In particular, a data signal is received at an integrated circuit at a step 1102. A first clock and data recovery circuit is implemented in the data receiver to recover the data of the data signal at a step 1104. A second clock and data recovery circuit is implemented in the data receiver to adjust a clock phase offset at a step 1106.

Figure 12:
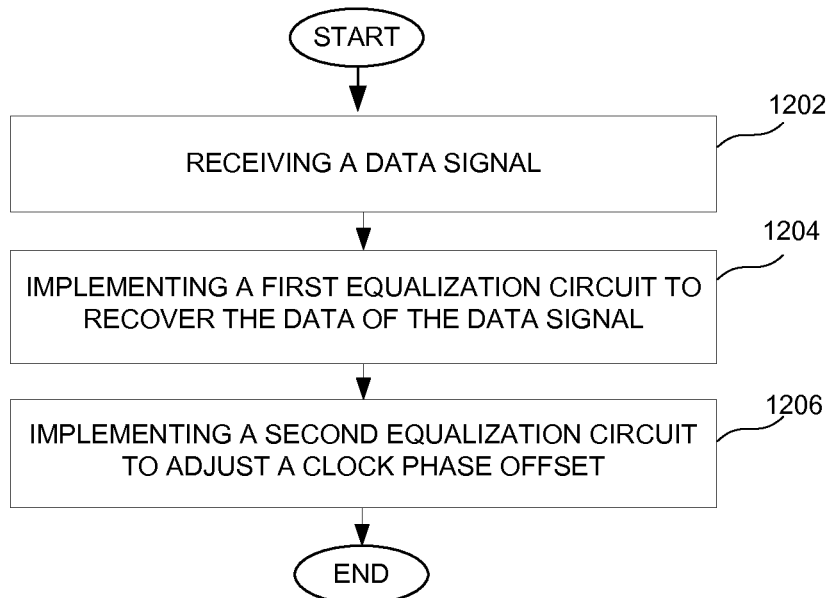
FIG. 12 is another flow chart showing a method of transmitting data in an integrated circuit.

Turning now to FIG. 12, a flow chart shows a method of implementing a data receiver in an integrated circuit. In particular, a data signal is received at an integrated circuit at a step 1202. A first equalization circuit is implemented in the data receiver to recover the data of the data signal at a step 1204. A second equalization is implemented in the data receiver to adjust a clock phase offset at a step 1206.

The various elements of the methods of FIGS. 11 and 12 may be implemented using the circuits of FIGS. 1-10 as described, or using some other suitable circuits. While specific elements of the method are described, it should be understood that additional elements of the method, or additional details related to the elements, could be implemented according to the disclosure of FIGS. 1-10.

It can therefore be appreciated that new circuits for and methods of implementing a data transceiver in an integrated circuit has been described. It will be appreciated by those skilled in the art that numerous alternatives and equivalents will be seen to exist which incorporate the disclosed invention. As a result, the invention is not to be limited by the foregoing implementations, but only by the following claims.

We claim:

1. A data receiver implemented in an integrated circuit, the data receiver comprising:
   an input receiving a data signal;
   a phase locked loop configured to generate a reference clock signal;
   a first equalization circuit configured to receive the data signal, wherein the first equalization circuit is used to receive data of the data signal;
   a first register coupled to an output of the first equalization circuit;
   a first phase interpolator configured to receive the reference clock signal, wherein the first phase interpolator is configured to control the first register using a first clock signal;
   a second equalization circuit configured to receive the data signal;
   a second register coupled to an output of the second equalization circuit; and
   a second phase interpolator configured to receive the reference clock signal, wherein the second phase interpolator is configured to control the second register using a second clock signal that is different than the first clock signal, wherein the first clock signal is generated separately from the second clock signal, and wherein the second phase interpolator enables adjusting a clock phase offset associated with drifting of the reference clock signal;
   wherein the second equalization circuit is different than the first equalization circuit; and
   wherein the first phase interpolator enables a first function of said controlling the first register using the first clock signal while the second phase interpolator enables a second function of said adjusting the clock phase offset using the second clock signal.

2. The data receiver of claim 1 wherein the first equalization circuit comprises a linear equalization circuit.

3. The data receiver of claim 2 wherein the linear equalization circuit comprises a long-tail correcting continuous time linear equalization circuit.

4. The data receiver of claim 1 wherein the first equalization circuit is coupled to a decision feedback equalization circuit.

5. The data receiver of claim 4 wherein the decision feedback equalization circuit comprises an unrolling decision feedback equalization circuit.

6. The data receiver of claim 1 wherein the second equalization circuit comprises a continuous time linear equalization circuit.

7. The data receiver of claim 6 wherein the continuous time linear equalization circuit comprises a channel inversion continuous time linear equalization circuit.

8. A data receiver implemented in an integrated circuit, the data receiver comprising:
   an input receiving a data signal;
   a phase locked loop configured to generate a reference clock signal;
   a first linear equalization circuit coupled to the input;
   a first clock and data recovery circuit used to receive data of the data signal, wherein the first clock and data recovery circuit controls a first phase interpolator configured to receive the reference clock signal, wherein the first phase interpolator generates a first clock signal controlling a first register coupled to an output of the first linear equalization circuit, and wherein the first clock and data recovery circuit enables a first function of receiving the data of the data signal using the first clock signal;
   a second linear equalization circuit coupled to the input, wherein the second linear equalization circuit is different than the first linear equalization circuit; and
   a second clock and data recovery circuit used to adjust a clock phase offset associated with drifting of the reference clock, wherein the second clock and data recovery circuit controls a second phase interpolator configured to receive the reference clock signal, wherein the second phase interpolator generates a second clock signal controlling a second register coupled to an output of the second linear equalization circuit, wherein the second clock and data recovery circuit enables a second function of adjusting the clock phase offset, while
   the first clock and data recovery circuit enables the first function of receiving the data of the data signal, using the second clock signal that is different than the first clock signal, and wherein the first clock signal is generated separately from the second clock signal.

9. The data receiver of claim 8 wherein the first clock and data recovery circuit used to receive data of the data signal uses major crossings between data bits to extract clock timing information in the data signal.

10. The data receiver of claim 9 wherein the first clock and data recovery circuit comprises an Alexander clock and data recovery circuit.

11. The data receiver of claim 9 wherein the second clock and data recovery circuit used to adjust a clock phase offset uses minor crossings between data bits to extract clock timing information in the data signal.

12. The data receiver of claim 11 wherein the second clock and data recovery circuit used to adjust a clock phase offset comprises a Mueller-Muller circuit.

13. The data receiver of claim 8 wherein the first linear equalization circuit comprises a long-tail continuous time linear equalization circuit.

14. The data receiver of claim 13 wherein the second linear equalization circuit comprises a channel inversion continuous time linear equalization circuit.

15. A method of implementing a data receiver in an integrated circuit, the method comprising:
   receiving a data signal;
   configuring a phase locked loop to generate a reference clock signal;
   coupling the data signal to a first linear equalization circuit;
   implementing a first clock and data recovery circuit in the data receiver to recover data of the data signal, wherein the first clock and data recovery circuit controls a first phase interpolator configured to receive the reference clock signal, wherein the first phase interpolator generates a first clock signal controlling a first register coupled to an output of the first linear equalization circuit, and wherein the first clock and data recovery circuit enables a first function of receiving the data signal using the first clock signal;
   coupling the data signal to a second linear equalization circuit, wherein the second linear equalization circuit is different than the first linear equalization circuit; and
   implementing a second clock and data recovery circuit in the data receiver to adjust a clock phase offset associated with drifting of the reference clock signal, wherein the second clock and data recovery circuit controls a second phase interpolator configured to receive the reference clock signal, wherein the second phase interpolator generates a second clock signal controlling a second register coupled to an output of the second linear equalization circuit, wherein the second clock and data recovery circuit enables a second function of adjusting the clock phase offset, the first clock and data recovery circuit enables the first function of receiving the data of the data signal, using the second clock signal that is different than the first clock signal, and wherein the first clock signal is generated separately from the second clock signal.

16. The method of claim 15 wherein coupling the data signal to a first linear equalization circuit comprises coupling the data signal to a long-tail correcting continuous time linear equalization circuit.

17. The method of claim 16 wherein coupling the data signal to a second linear equalization circuit comprises coupling the data to a channel inversion continuous time linear equalization circuit.

18. The method of claim 17 wherein the second clock and data recovery circuit is different than the first clock and data recovery circuit.

19. The method of claim 15 wherein implementing a first clock and data recovery circuit to recover the data of the data signal comprises implementing an Alexander clock and data recovery circuit.

20. The method of claim 15 wherein implementing a second clock and data recovery circuit to adjust a clock phase offset comprises implementing a Mueller-Muller clock and data recovery circuit.

* * * * *